(12) United States Patent
Proell et al.

(10) Patent No.: US 11,444,357 B2
(45) Date of Patent: Sep. 13, 2022

(54) METHOD FOR JOINING A BATTERY ELEMENT

(71) Applicants: Robert Bosch GmbH, Stuttgart (DE); GS Yuasa International Ltd., Kyoto (JP)

(72) Inventors: Johannes Proell, Bamberg (DE); Andreas Ringk, Bamberg (DE)

(73) Assignees: Robert Bosch GmbH, Stuttgart (DE); GS Yuasa International Ltd., Kyoto (JP)

( * ) Notice: Subject to any disclaimer, the term of this patent is extended or adjusted under 35 U.S.C. 154(b) by 806 days.

(21) Appl. No.: 16/387,738

(22) Filed: Apr. 18, 2019

(65) Prior Publication Data

US 2019/0326575 A1    Oct. 24, 2019

(30) Foreign Application Priority Data

Apr. 23, 2018   (DE) .......................... 102018206186.6

(51) Int. Cl.
*H01M 50/403*     (2021.01)
*H01M 50/46*      (2021.01)
(Continued)

(52) U.S. Cl.
CPC ......... *H01M 50/403* (2021.01); *H01M 10/04* (2013.01); *H01M 10/0413* (2013.01);
(Continued)

(58) Field of Classification Search
CPC .. H01M 50/403; H01M 50/449; H01M 50/46; H01M 10/0413; H01M 10/0404;
(Continued)

(56) References Cited

U.S. PATENT DOCUMENTS

2007/0068632 A1\* 3/2007 Bertram .............. B29C 66/8122
156/583.1
2015/0129107 A1\* 5/2015 Miyazaki .......... H01M 10/0404
156/522

(Continued)

FOREIGN PATENT DOCUMENTS

DE    10 2015 112 067 A1    2/2016
DE    10 2016 105 120 A1    9/2016
(Continued)

*Primary Examiner* — Maria Laios
*Assistant Examiner* — Adam J Francis
(74) *Attorney, Agent, or Firm* — Maginot, Moore & Beck, LLP

(57) ABSTRACT

A process for joining a battery element (49) by at least one polymer thread (28, 30), comprises the method steps:
a) applying a web-shaped or sheet-shaped electrode material (16) to a first separator web (12),
b) heating the at least one polymer thread (28, 30) above the softening temperature of the polymer material,
c) introducing at least one polymer thread (28, 30) between the first separator web (12) and a further second separator web (40) to be applied to the first separator web (12), and
d) cooling the at least one polymer thread (28, 30) between the separator webs (12, 40) and forming at least one material-bond compound (46, 48) therebetween.

14 Claims, 7 Drawing Sheets

(51) Int. Cl.
    *H01M 50/449*    (2021.01)
    *H01M 10/04*     (2006.01)

(52) U.S. Cl.
    CPC ......... *H01M 50/449* (2021.01); *H01M 50/46* (2021.01); *H01M 10/0404* (2013.01); *H01M 2220/20* (2013.01)

(58) Field of Classification Search
    CPC .. H01M 10/04; H01M 2220/20; H01M 50/04; B29C 65/42; B29C 65/425; B29C 66/43; B32B 37/0076; B32B 37/04; B32B 37/06
    See application file for complete search history.

(56) References Cited

U.S. PATENT DOCUMENTS

2016/0190640 A1*  6/2016  Visco ................ H01M 50/437
                                                 429/322
2018/0175345 A1*  6/2018  Schmid-Schoenbein ...................
                                                 H01M 10/647

FOREIGN PATENT DOCUMENTS

EP          0077846 A1 *  5/1983  .......... H01M 50/463
EP          2312673 A1    4/2011

* cited by examiner

METHOD FOR JOINING A BATTERY ELEMENT

This application claims priority to German Application No. DE 102018206186.6, filed on Apr. 23, 2018. The entire contents of the above-mentioned patent applications are incorporated herein by reference as part of the disclosure of this U.S. application.

TECHNICAL FIELD

The invention relates to a method for joining a battery element with at least one polymer thread and the use of such a battery element in a battery for an electric vehicle (EV), a hybrid vehicle (HEV) and a plug-in hybrid vehicle (PHEV).

PRIOR ART

US 2002/0160259 A1 relates to a laminated separator material for a battery. A non-woven material has a substantially laminated structure and includes a first layer of a non-woven material defining a first surface of the material. A second layer of non-woven fibers defines the opposite surface of the material. Finally, a third layer of non-woven fibers is received between the first and second layers. The layers are glued together and form a laminate. At least one of the non-woven layers comprises a non-woven web of fused fibres. In addition, one or more of the layers is permanently hydrophilic in that the non-woven web is formed of molten fibers of a normally hydrophobic polymer which comprises a hydrophilic additive.

SUMMARY OF THE INVENTION

According to the invention, a method for joining a battery element by at least one polymer thread is proposed, comprising the following method steps:
a) applying a web or sheet-shaped electrode material to a first separator web,
b) heating said at least one polymer thread within a heating zone beyond a softening temperature,
c) introducing the at least one polymer thread between the first separator web and another second separator web to be applied to the first separator web; and
d) cooling of the at least one polymer thread between the separator webs and forming at least one material bond (material locking) connection between them.

With the solution proposed in accordance with the invention, a soft polymer thread can be used to achieve a material bond connection between the two separator webs when the polymer thread cools and an electrode material arranged between the separator sheets can be encapsulated. The composite produced can then be cut and used for stacking electrodes. The method proposed according to the invention offers an extremely short cycle time in which harmless polymer materials can be used for a battery cell. Depending on the temperature diameter of the at least one polymer thread used, also very thin battery elements can be produced.

In a further embodiment of the method according to the invention, at least one polymer thread is made of a polymer selected from the following group: polyethylene (PE), polypropylene (PP), polyphthalamide (PPa), polyamide (PA). In addition, any fusible materials can be used. For thermoplastics for example polyparaphylene sulfide (PPS), Teflon (PTFE), polyvinylidene fluoride (PVDF) and polyurethane (PU). Thermoplastic elastomers such as styrene block polymers are also suitable, such as SBS, SEBS, SEPS, SEEPS and MBS.

Following the method proposed in accordance with the invention, the at least one polymer thread is aligned with a positioning component before carrying out process step b). This means that when the at least one polymer thread is supplied, it is placed on the first separator web in such a way that the electrode material already placed and aligned thereon remains in its position and a material bond connection between the first separator web and a second separator web yet to be placed does not contact the electrode material.

The heating of at least one polymer filament according to method step b) is carried out in heating elements which may have passage openings and heat at least one polymer thread during the passage of the heating elements. When the at least one polymer thread is heated, it is heated above its softening temperature, so that when the connection between the first separator web and the second separator web is formed, a plastic deformation occurs, which later represents the material bond connection, preferably an adhesive connection.

Optionally, it is possible to preheat the at least one polymer thread or filament for carrying out method step b) during passage of the positioning component. The positioning component can, for example, be formed by a pair of guide rollers having individual guide rings, which can optionally also be heated and which preheats the at least one polymer thread passing through the positioning component.

In an advantageous manner, when carrying out the method proposed in accordance with the invention, at process step c) at least one polymer thread is pressed against the first separator web by at least one pressing device, wherein the second separator web is supplied simultaneously and is pressed against the softened at least one polymer thread.

The solution proposed in accordance with the invention ensures that the second separator web is preferably applied almost simultaneously with the softened polymer thread as part of a vertical feed, so that the at least one polymer thread is not yet cooling, but the second separator web, on which the at least one polymer thread is applied to the first separator web, is pressed as long as it is still plastically deformable. In this way, a continuous material bond connection between the first separator web and the second separator web that does not affect the electrode material can be ensured in a single operation. In the method proposed in accordance with the invention, the electrode material, be it for an anode or for a cathode, can be applied to the first separator web as a sheet, forming gaps, according to process step a). On the other hand, it is also possible to apply a continuous web of electrode material to the first separator web. Both implementation variants of the method proposed in accordance with the invention are possible.

The process steps a) to d) of the method proposed according to the invention can be carried out in one joining station or in several successive joining stations seen in the direction of movement of the battery element to be manufactured. The method proposed in accordance with the invention thus opens up the possibility of producing individual discrete battery elements in which an electrode material is encapsulated surrounded by a first separator web and a second separator web, or also the possibility of producing battery elements which can have a plurality of, for example, sections of an electrode material, each separated by a separator web. The two implementation variants of the procedure proposed in accordance with the invention ensure encapsulation of the electrode material separated from the two separator webs.

The temperature range for heating the polymer threads should be above or close to the glass temperature or melting point of the respective material. Before the heated polymer thread is pressed on, an optional active cooling may be provided in order to regulate the temperature again if necessary before the formation of the material bond takes place.

The method in accordance with the invention is advantageously used, among other things, in a battery system of a pure electric vehicle, a hybrid vehicle, a plug-in hybrid vehicle or an e-bike. But other uses are also conceivable.

Advantages of the Invention

The method proposed in accordance with the invention provides a method with extremely short cycle times for the production of a battery element. In the method proposed in accordance with the invention, harmless polymers, in particular polyethylene (PE), polypropylene (PP), polyphthalamide (PPa) or polyamide (PA), are used as polymer thread material for the battery element. In principle, all fusible materials can be used. For thermoplastics for example polyparaphylene sulfide (PPS), Teflon (PTFE), polyvinylidene fluoride (PVDF) and polyurethane (PU). Thermoplastic elastomers such as styrene block polymers (SBS, SEBS, SEPS, SEEPS and MBS) can also be used. Depending on the diameter of the polymer thread used, very thin joints can be produced from said polymer materials, which are preferably embodied in the form of a material bond adhesive joint in seam form. The formation of the material bond between the two separator webs also depends on the temperature.

The method proposed in accordance with the invention can be integrated into the manufacture of battery cells in such a way that the material-bond connection between the two separator webs, including an electrode material, allows stacks of battery elements to be formed which can later be integrated in further method steps for the manufacture of a battery cell. The material-bond connection in seam form produced between the two separator webs, including an electrode material, can be used as a stacking aid in further process steps of a manufacturing method for battery cells.

The method proposed in accordance with the invention is further characterised by the fact that the electrode material can be processed in sheet form or also in web form and, depending on the number of joining stations used to carry out process steps a) to d), battery elements can be produced which contain several layers of an electrode material, each separated by a separator web.

The solution proposed according to the invention makes it possible to use particularly inexpensive materials such as polymers like PP and PE, which are quite inexpensive compared to adhesives compared to the material costs incurred in each case.

BRIEF DESCRIPTION OF THE DRAWINGS

The invention is described in more detail below with reference to the drawing.

In the drawings.

DETAILED DESCRIPTION

Figure 1:
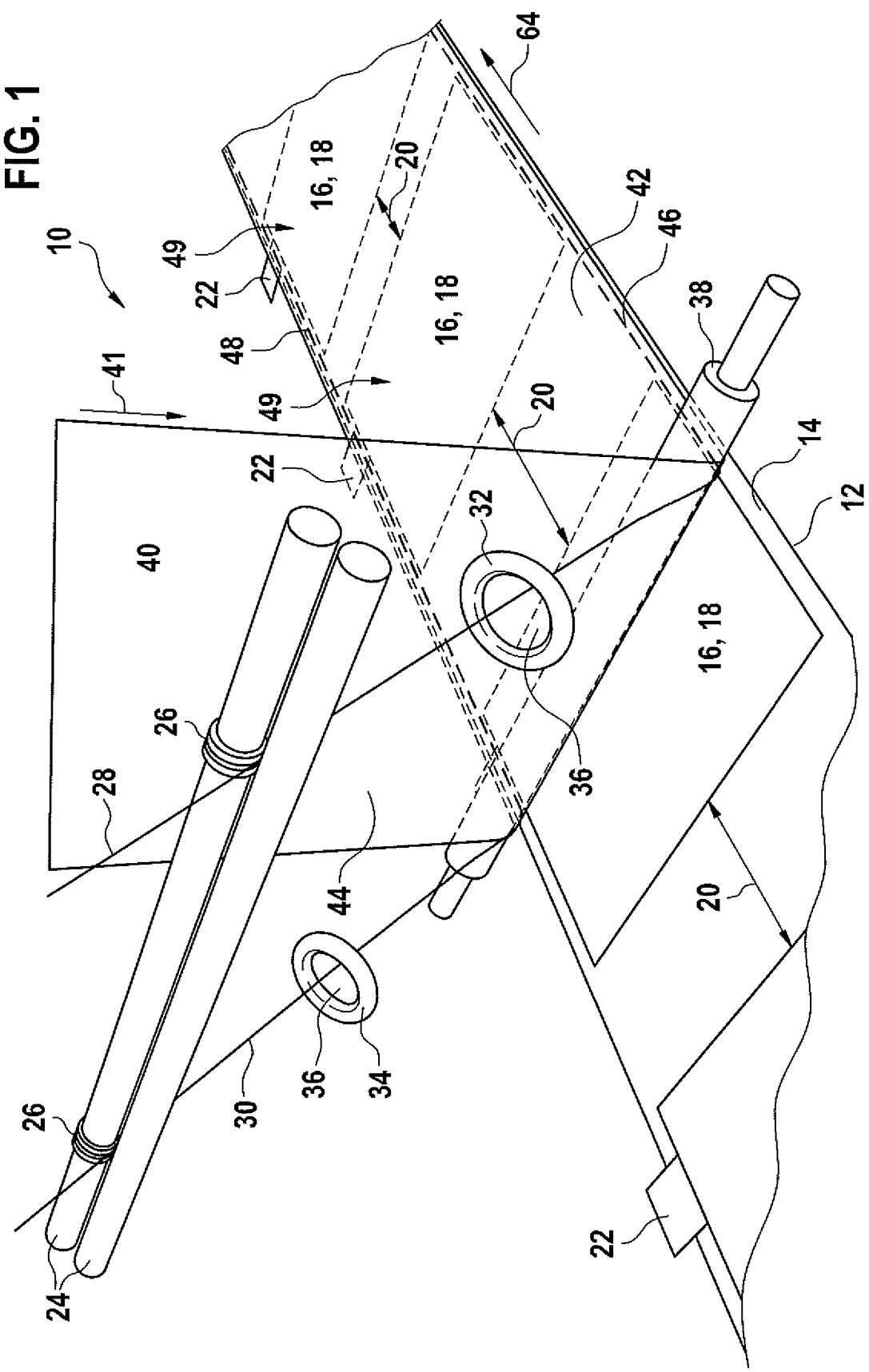
FIG. 1 is a perspective top view of a joining station for carrying out the procedure proposed in accordance with the invention.

The illustration in FIG. 1 shows a perspective view of a joining station for carrying out the method proposed in accordance with the invention.

A first separator web 12 runs into a joining station 10 in the direction of motion 64. On a top side 14 of the first separator web 12 there is an electrode material 16, which is designed here as a sheet 18. It can be applied to the top side 14 of the first separator web 12 via a rotating wheel—not shown here in detail—whereby gaps 20 are produced between the individual sheets 18 of the electrode material 16, be it an electrode material for a cathode or an electrode material for an anode. The arrangement of the first separator web 12 with sheets 18 arranged on its upper side 14, each on gap 20, of electrode material 16 moves in the direction of movement 64 and passes through a pressing device 38. The sheets 18 of electrode material 16 each have a contact lug 22 which projects outwardly from the edge of the first separator web 12.

Above the pressing device 38 a first polymer thread 28 and a second polymer thread 30 run to a positioning component 24. The positioning component 24 can, for example, be formed by a pair of rollers, which can optionally also be heated. On the circumferential surface of the positioning component 24 there are positioning elements 26 spaced apart from each other, which can be designed, for example, in ring form and through which a first polymer thread 28 and a second polymer thread 30 run in the direction of the pressing device 38. The first polymer thread 28 and the second polymer thread 30 each pass through a first heating element 32 and a second heating element 34, which are formed in ring form and each have a passage opening 36. Depending on the diameter of the passage opening 36 and the material of the first polymer thread 28 and the second polymer thread 30, the heating of the polymer material of the first polymer thread 28 and the second polymer thread 30 can be adjusted. The polymer materials from which the first polymer thread 28 and the second polymer thread 30 can be made are materials such as polyethylene (PE), polypropylene (PP), polyphthalamide (PPa) or polyamide (PA).

From the perspective shown in FIG. 1 it can be seen that the first polymer thread 28 and the second polymer thread 30 are conveyed obliquely in the direction of the pressing device 38. At the same time, a vertical feed 41 of a second separator web 40 takes place. A top or upper side of the second separator web 40 is designated with reference numeral 42, while a bottom side of the second separator web 40 is designated with reference numeral 44. When conveying the first separator web 12 with sheet 18 of the electrode material 16 arranged at gap 20, the two polymer threads 28, 30 and the second separator web 40 are fed in such a way that the two polymer threads 28, 30 reach the pressing device 38 upstream of the second separator web 40, so that the second separator web 40 with its underside 44 presses the plastically deformable polymer threads 28, 30 before-hand applied to the first separator web 12. This creates a first connection 46 and a second connection 48 in seam form between the top side 14 of the first separator web 12 on the one hand and the bottom side 44 of the second separator web 40 on the other hand.

As can be seen from FIG. 1, the first connection 46 and the second connection 48 extend parallel to the direction of movement 64 of a composite, namely of a battery element 49 of first separator web 12, the electrode material 16 present as sheet 18 and the second separator web 40. The position of the first connection 46 and the second connection 48 is defined by the positioning component 24 and selected so that the electrode material 16 encapsulated by both separator webs 12, 40 is not affected.

The contact lug 22 protrudes laterally from each battery element 49 produced. After the battery elements 49 are produced as a composite of first separator web 12, electrode material 16 and second separator web 40, these can be cut and used for stacking battery elements 49 to produce a battery cell. After passage of the pressing device 38, the material of the first polymer thread 28 and the second polymer thread 30 cools down, solidifies and forms the first compound 46 and the second compound 48 in seam form between the first separator web 12 and the second separator web 40. Optionally, the pressing device 38 can also be designed to be heatable, so that the polymer threads 28, 30 can be heated again briefly above their softening temperature in order to achieve the thinnest possible joints 46, 48, designed as bonded adhesive joints, between the first separator web 12 and the second separator web 40.

Figure 2:
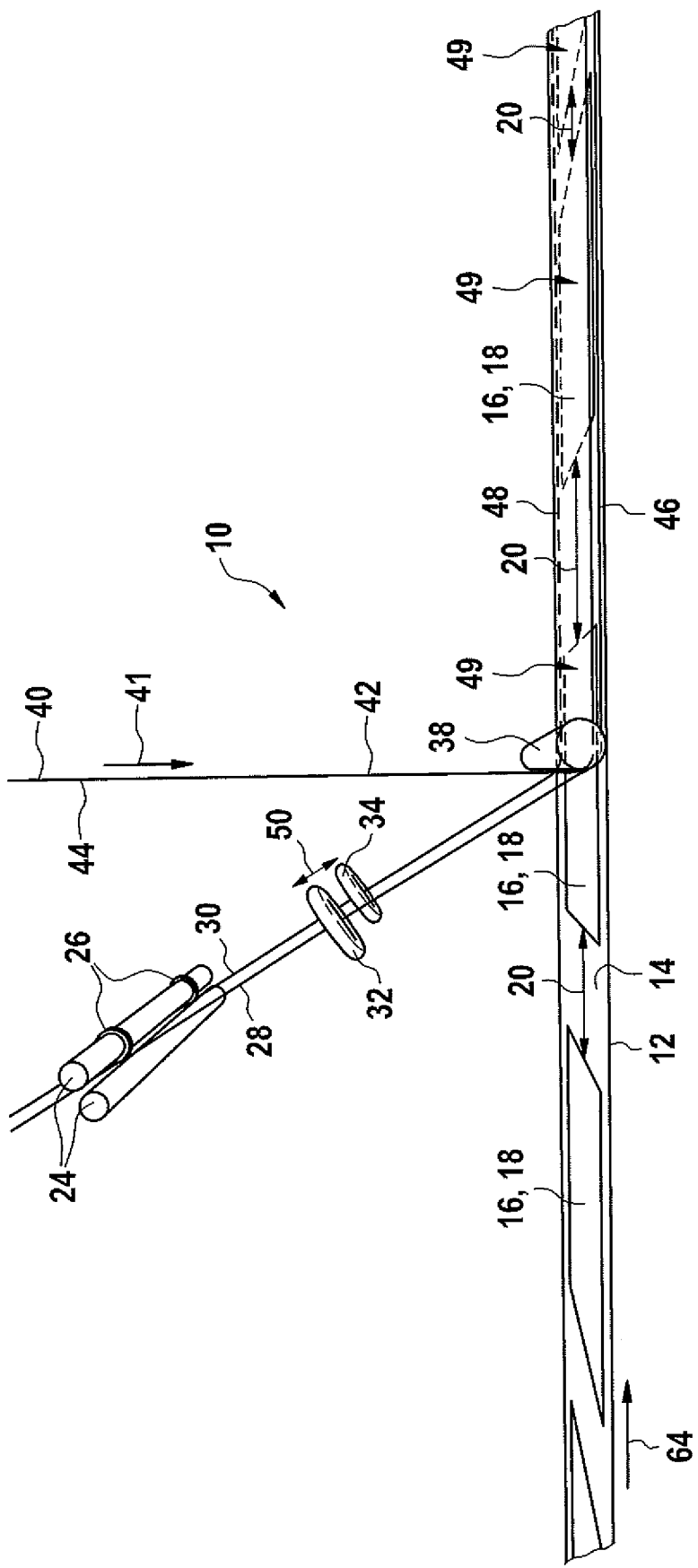
FIG. 2 is a side view of the joining station according to FIG. 1.

FIG. 2 shows a side view of a joining station 10 for the manufacture of battery elements 49.

FIG. 2 shows that the electrode material 16 here is applied as sheet 18 to gap 20 on the upper side 14 of the first separator web 12. The electrode material 16 can be both an electrode material for an anode and an electrode material for a cathode. The two polymer threads 28, 30, aligned with the positioning elements 26 of positioning component 24, undergo heating when passing through a heating zone 50, heated by the heating elements 32, 34, which is preferably slightly above the softening temperature. From the side view according to FIG. 2 it can be seen that the second separator web 40 undergoes a substantially vertical feed 41, such that the two polymer threads 28, 30 arrive slightly earlier on the upper side 14 of the first separator web 12, before the second separator web 40, coming from above, is placed on it by means of the pressing device 38 and forms the first connection or joint 46 as well as the second connection 48.

When the two polymer threads 28 and 30 pass through the heating elements 32 and 34, a heating zone 50 is created which, depending on the diameter of the heating elements 32 and 34, which are for example ring-shaped, runs through them. As an option, the positioning component or rollers 24 and the pressing device 38 can also be designed to be heatable in order to create optimum joining conditions after passage of the pressing device 38 between the second separator web 40 and the first separator web 12. The composites of the first separator web 12, electrode material 16, for example as an sheet 18, and the second separator web 40 created after the connection of the two separator webs 12 and 40 respectively, form the battery elements 49.

Figure 3:
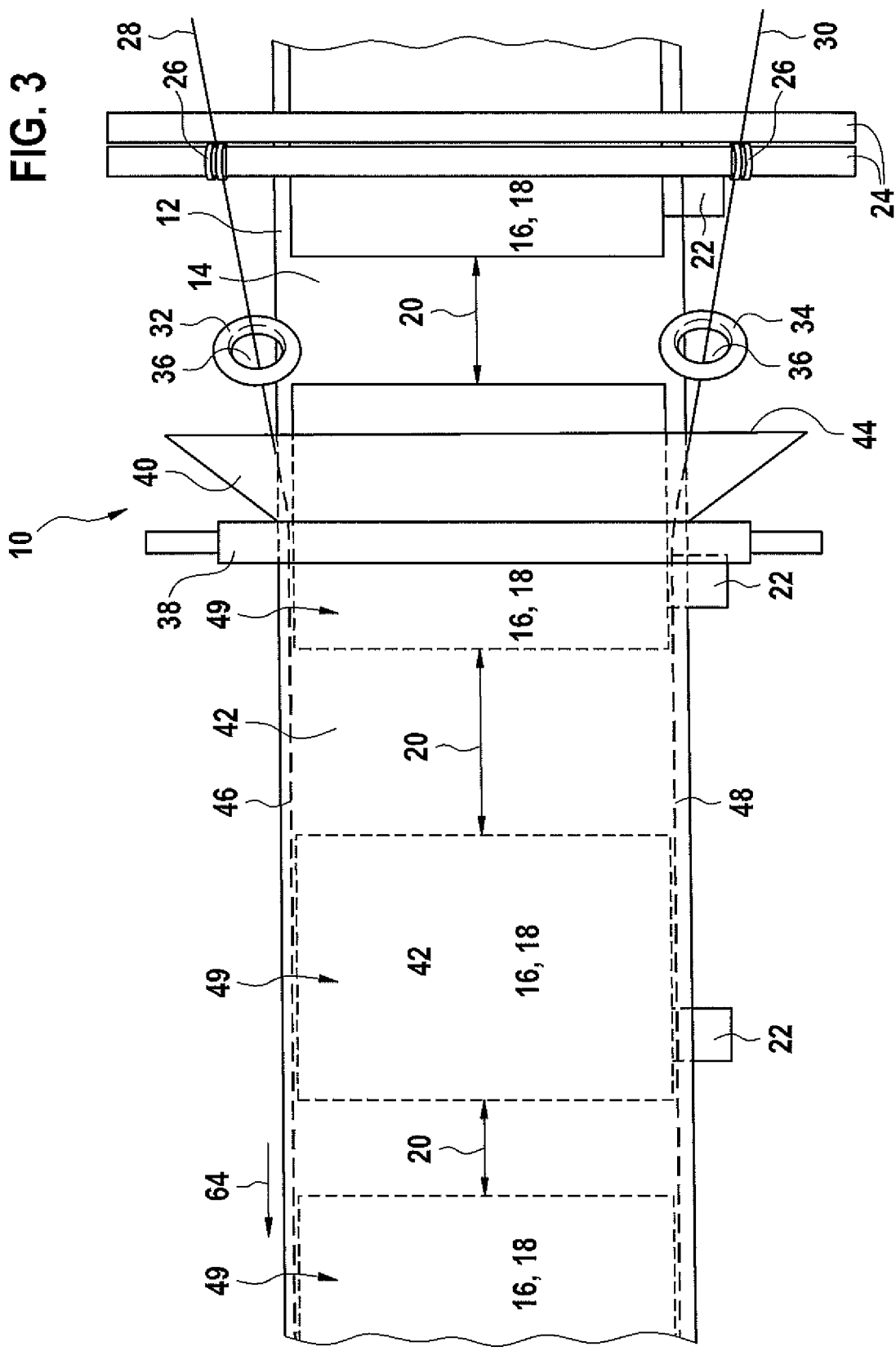
FIG. 3 is a top view of the joining station shown in FIG. 1.

FIG. 3 shows the joining station 10 from a bird's eye view.

The plan view shown in FIG. 3 shows that the positioning elements 26, e.g. designed as rings at the positioning component 24, can be designed as a pair of guide rollers at a distance from each other that exceeds the width of the first separator web 12. This allows optimum feeding of the first polymer thread 28 and the second polymer thread 30 in the direction of the first separator web 12 in the area of the pressing device 38. On the first separator web 12, the electrode material 16—here in the form of sheets 18—is arranged with a gap 20 formed between each sheet 18. From the top view as shown in FIG. 3 it can be seen that the two polymer threads 28 and 30 respectively reach the top side 14 of the first separator web 12 before the second separator web 40, i.e. before its bottom side 44 hits the softened polymer threads 28 and 30. Under the pressure of the pressing device 38, the respective connections 46 and 48, which extend in the direction of movement 64 of the manufactured battery elements 49, are respectively formed. Both the positioning component 24 and the pressing device 38 can be made heatable in order to keep the temperature of the material of the two polymer threads 28, 30 above the softening temperature, so that after passage of the pressing device reliable material-bond connections 46, 48 in seam form are obtained.

Figure 4:
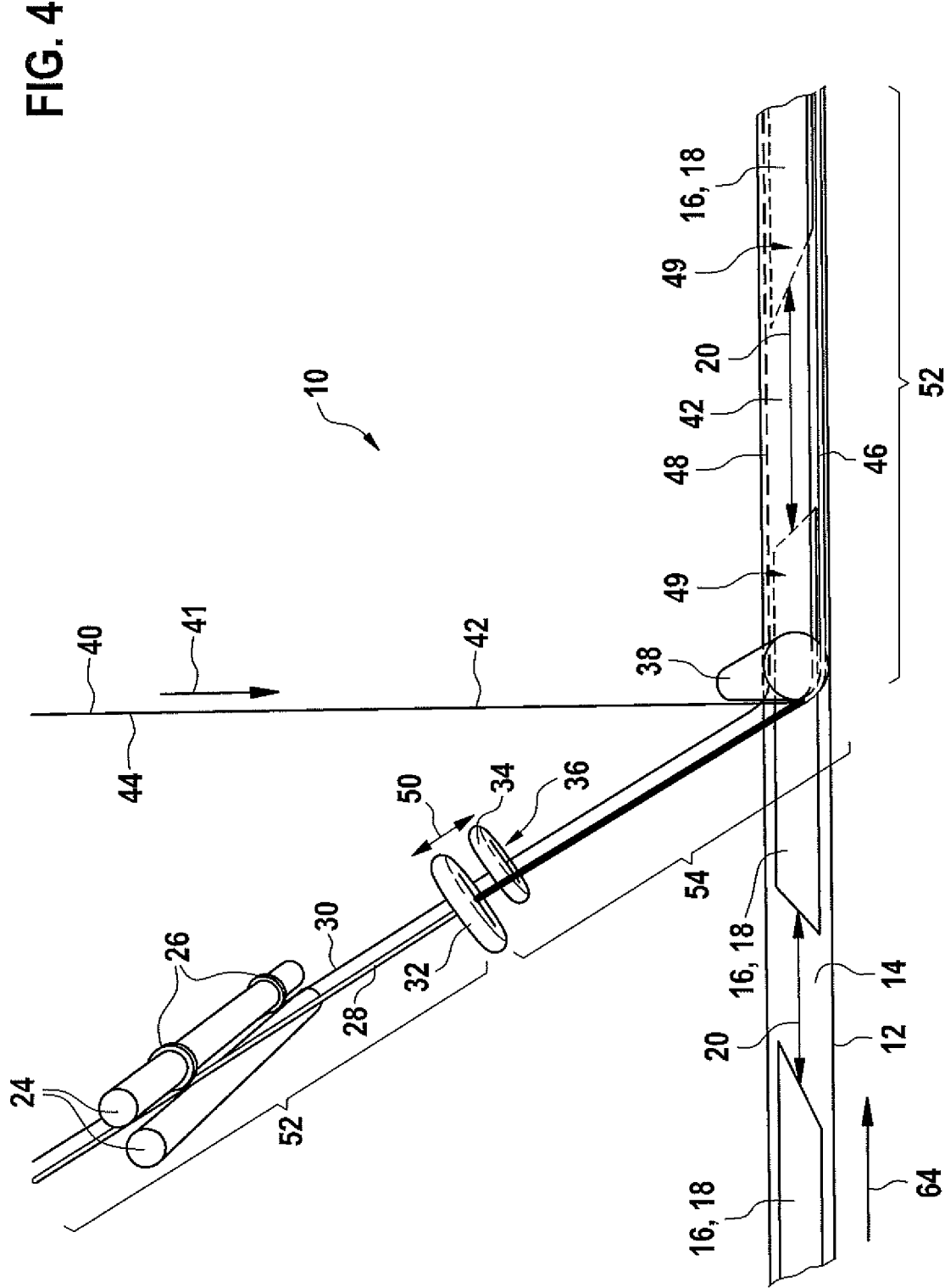
FIG. 4 shows temperature gradients in the at least one polymer thread before and after heating.

FIG. 4 shows the representation of a temperature gradient in the material of the polymer threads 28, 30.

In the method proposed in accordance with the invention, the material of the first polymer thread 28 and the second polymer thread 30 is heated essentially by the heating elements 32, 34 when the polymer threads 28, 30 pass through the respective passage openings 36. The temperature in the material of the polymer threads 28, 30 is adjusted depending on the thread thickness of the polymer threads 28, 30 as well as depending on the diameter of the passage opening 36 in the two heating elements 32, 34. Along the heating zone 50, a non-temperature associated area (untempered area) 52 changes into a temperature-associated/controlled area (tempered area) 54 of the two polymer threads 28, 30.

In addition, it is possible to heat the material of the two polymer threads 28, 30 already during the passage of positioning component 24, for example by designing the positioning component 24 with a heating. In this case, the material of the two polymer threads 28, 30 is heated in two stages.

In addition, it is also possible to control the temperature of (temper) the pressing device 38. Although the polymer threads 28 and 30 leave the heating zone 50 with temperature-controlled areas 54, depending on the distance of the heating elements 32 and 34 from the pressing direction 38, an undesired cooling of the material can occur, so that a further temperature control/application can take place via an optionally heatable pressing device 38. This ensures that at the moment of joining the first separator web 12 with the underside 44 of the second separator web 40, the material of the polymer threads 28, 30 has a temperature that is above the softening temperature of the polymer material used in each case. FIG. 4 also shows that the second separator web 40 is essentially fed as a vertical feed 41. After passage of the pressing device 38, battery elements 49 are created comprising the first separator web 12, the electrode material 16 in the form of a sheet 18 and the second separator web 40, which are glued together along connections 46, 48. The connections 46, 48 cool down and harden when the manufactured battery elements 49 are conveyed further in the direction of movement 64.

Figure 5:
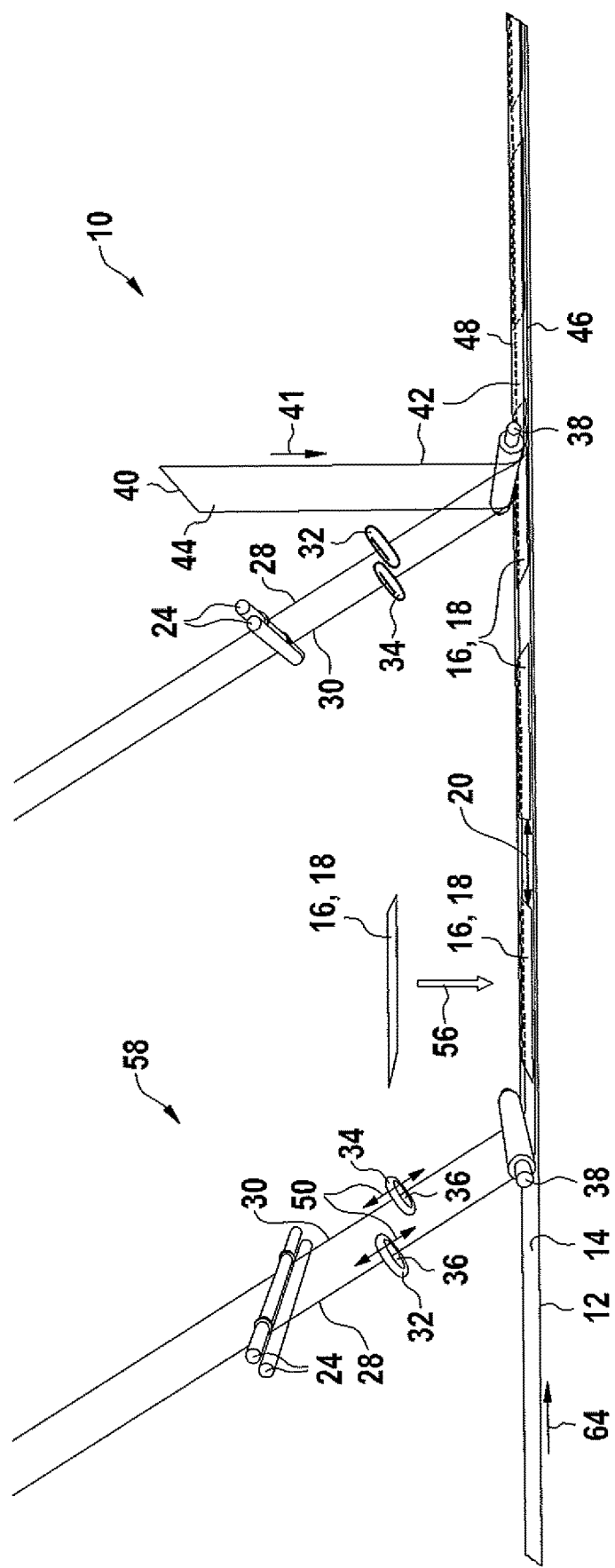
FIG. 5 shows two joining stations arranged one behind the other in the direction of movement of the manufactured battery elements.

FIG. 5 shows the arrangement of a first joining station 10 and an upstream joining station 58.

With the realization variant shown in FIG. 5, it is possible, for example, that there is a deposition 56 of electrode material 16 cut out as sheets 18 onto the first separator web 12 conveyed in the direction of movement 64. Thus, the sheets 18 of the electrode material 16 can be fixed on the first separator web 12 after deposition 56, for example via a driven rotating wheel, by the polymer threads 28, 30 passing the heating elements 32, 34 and having been heated above their softening temperature. According to the deposition 56 of the electrode material 16 as in the form of a sheet 18, gaps 20 can be produced between the individual sheets 18 before an electrode material 16 fixed by the two polymer threads 28, 30 reaches the joining station 10 and furthermore the second separator web 40 is fixed with its bottom side 44 at the pressing device 38 by polymer threads 28, 30 which are tempered above their softening temperature and are also fixed to the pre-fixed composite of the first separator web 12 and the electrode material 16 as a sheet 18. Analogous to the above design variants, the first connection 46 and the second connection 48, which extend parallel to the direction of movement 64, are formed here by the pressing device 38 during curing and cooling of the polymer threads 28, 30 in the direction of movement 64.

Figure 6:
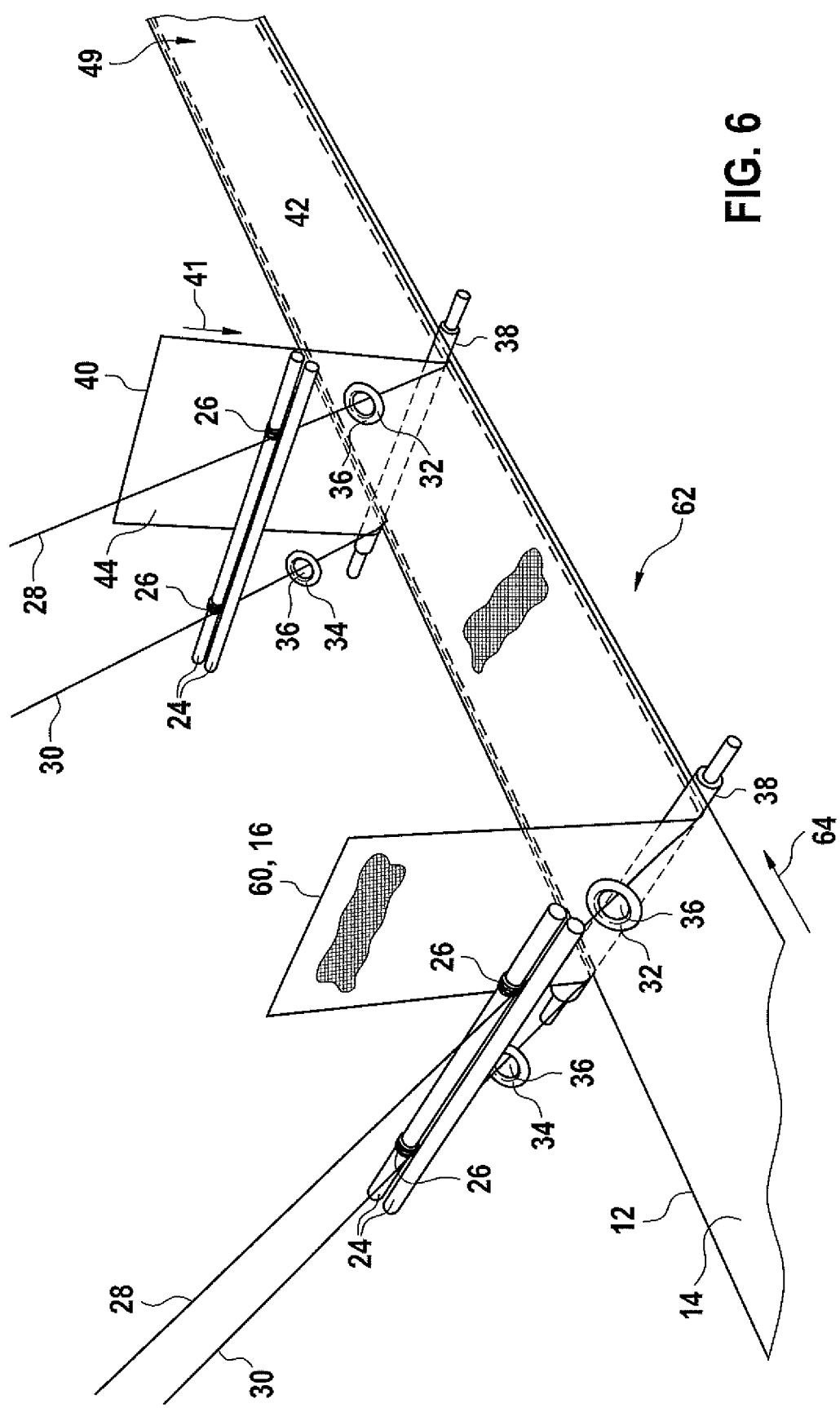
FIG. 6 shows the processing of a separator material in web form in a joining station.

The illustration in FIG. 6 shows the implementation of the method proposed in accordance with the invention with uncut electrode material 16.

In contrast to the versions shown above, the electrode material 16 in the illustration in FIG. 6 is not a sheet 18, but is in the form of a web 60. In a third joining station 62, in which electrode material 16 is processed in the form of the web 60, the polymer threads 28, 30 are tempered by first and second heating elements 32, 34 arranged below a positioning component 24 having annular positioning elements 26. Analogous to the joining stations 10, 58 described above, the first heating element 32 and the second heating element 34 each have passage openings 36 through which the polymer threads 28, 30 pass. As already mentioned above, the material of the two polymer threads 28, 30 is tempered to a temperature above the softening temperature of the polymer material.

In the direction of movement 64, the first separator web 12 is conveyed in parallel thereto, the top side of which passes the pressing device 38, which can be temperature-controlled or not. Shortly after the polymer threads 28 and 30 elastically deformable impinge on the upper side 14 of the first separator web 12, the electrode material 16 is fed in in the form of a web 60 essentially from the vertical direction. After passage of the pressing device 38, the web 60 of the electrode material 16 is fixed on the upper side 14 of the first separator web 12 by the material-bond connections 46, 48. If the composite of the first separator web 12 and electrode material 60 is conveyed further in the form of a web, the second separator web 40 from the vertical feed 41 is also provided with the second separator web 40 by polymer threads 28 and 30, which are tempered above their softening temperature, when passing the pressing device 38. Via the polymer threads 28, 30 applied here, the underside 44 of the second separator web 40 is connected to the upper side of the electrode material 16 in the form of a web 60. The resulting composite now provides an endless battery element 49, which can either be wound up or which can now be divided into individual battery elements 49 and can be further processed.

Figure 7:
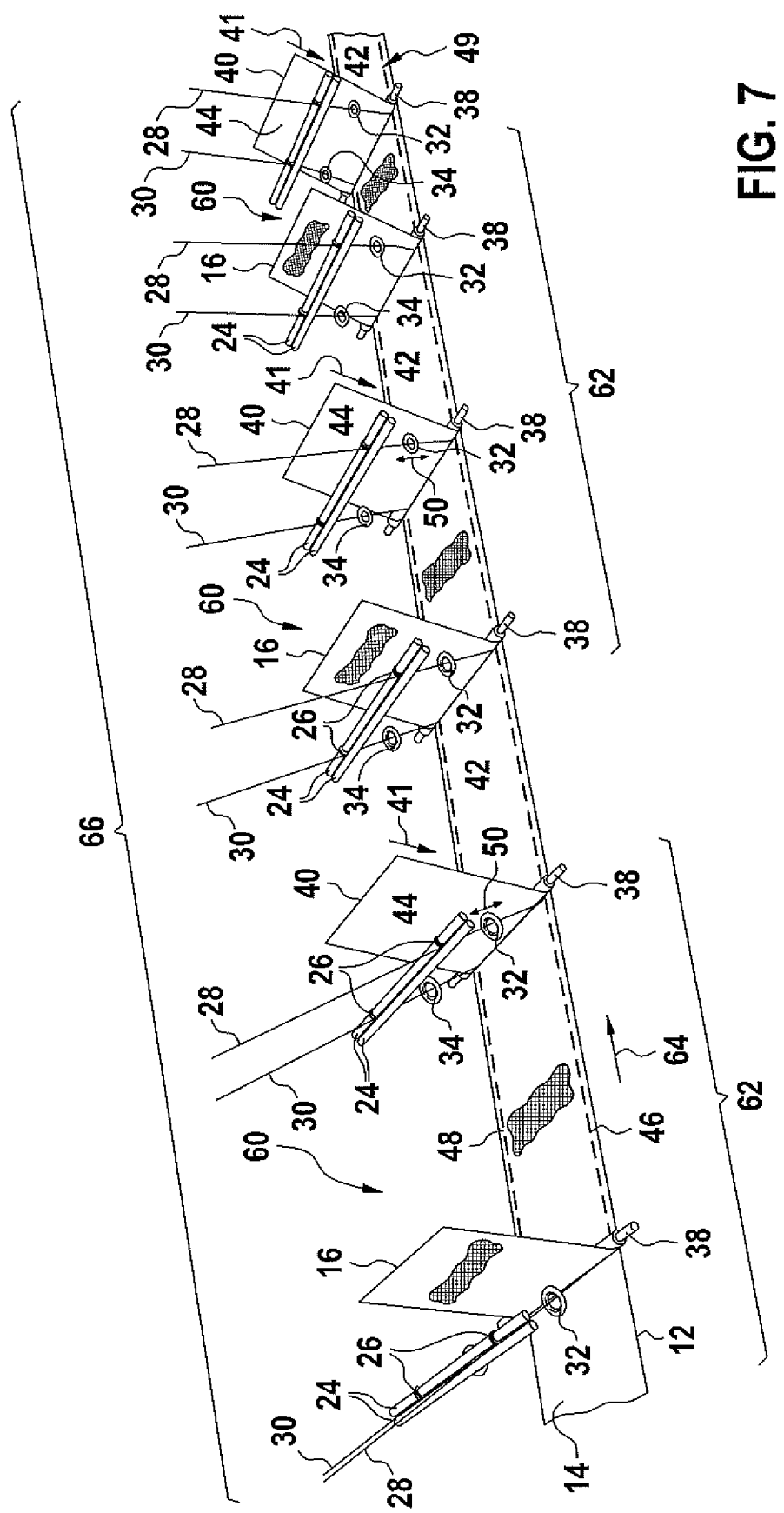
FIG. 7 shows a plurality of joining stations arranged one behind the other in the direction of movement of the manufactured battery elements.

FIG. 7 provides a line 66, formed by third joining stations 62 arranged one behind the other.

The design variant of a line 66 of third joining stations 62, as shown schematically in FIG. 7, allows any number of layers of electrode material 16, shown here in the form of a web 60 and separator tracks 12, 40, to be produced. Multi-layer battery elements 49 can thus be produced, in which the electrode material 16 is separated from the subsequent electrode material 16 by a separator web 12, 40. The structure of the third joining station 62, shown here in FIG. 7 as line 66, essentially corresponds to the structure of the third joining station 62, as described in connection with FIG. 6. First, the polymer threads 28, 30 are heated in the heating elements 32, 34. When passing the pressing device 38, the web 60 of the electrode material 16 is bonded to the upper side 14 of the first separator web 12. Cooling produces the first connection 46 and the second connection 48, before the second separator web 40 with its underside 44 is applied to the composite of the first separator web 12 and electrode material 16 in the form of a web 60 when passing the subsequent pressing device 38. Analogous to the design variants described above, the underside 44 of the second separator web 40 is fixed by the polymer threads 28, 30, which are fed to the pressing device 38 aligned at positioning component 24 by positioning elements 26, before the second separator web 40 with its underside 44 is applied to the upper side of the electrode material 16 in the form of the web 60.

In the third joining station following thereafter, the situation is analogous. Depending on the number of third joining stations 62, lined up in a line 66, battery elements 49 can be produced in continuous form, which can either be wound up and are processed into battery cells or fed into a cutting process and then further processed.

The invention is not limited to the embodiments described here and the aspects highlighted therein. To the contrary, within the scope defined by the claims, a large number of modifications are possible which are within the skills of the average expert.

The invention claimed is:

1. A method for joining a battery element by at least one polymer thread comprising the steps:
    a) applying a web-shaped or sheet-shaped electrode material to a first separator web,
    b) heating at least one polymer thread within a heating zone above a softening temperature of the polymer material of the thread,
    c) introducing at least one polymer thread between the first separator web and a further second separator web to be applied to the first separator web, and
    d) cooling the at least one polymer thread between the separator webs and forming at least one material-bond connection therebetween.

2. The method according to claim 1, characterized in that the at least one polymer thread is made of a polymer selected from the group including polyethylene (PE), polypropylene (PP), polyphthalamide (PPa), polyamide (PA).

3. The method according to claim 1, characterized in that the at least one polymer thread is produced from a meltable material.

4. The method according to claim 1, characterized in that the at least one polymer thread is aligned at a positioning component by positioning elements before carrying out method step b).

5. The method according to claim 1, characterized in that the at least one polymer thread according to process step b) is heated in heating elements having passage openings.

6. The method according to claim 4, characterized in that the at least one polymer thread is preheated at the positioning component before carrying out process step b).

7. Method according to claim 1, characterized in that the at least one polymer thread in process step c) is pressed against the first separator web and the simultaneously fed second separator web by means of at least one pressing device.

8. The method according to claim 1, characterized in that according to method step a) the electrode material is applied as a sheet to the first separator web, forming gaps.

9. The method according to claim 7, characterized in that the second separator web is fed to the pressing device from a vertical feed.

10. The method according to claim 1, characterized in that the method steps a) to d) are carried out in one or more joining stations arranged sequentially one behind the other in the direction of movement of the battery element.

11. A vehicle comprising a battery system including a battery element manufactured according to the method of claim 1, wherein the vehicle is selected from a pure electric vehicle, a hybrid vehicle, a plug-in hybrid vehicle and an e-bike.

12. The method according to claim 1, characterized in that the method steps a) to d) are carried out in a line of two or more joining station sections arranged sequentially one behind the other in the direction of movement of the battery element, each joining station section including two or more joining stations arranged sequentially one behind the other in the direction of movement of the battery element.

13. The method according to claim 3, characterized in that the meltable material is selected from the group including thermoplastic polyparaphylene sulphide (PPS), teflon (PTFE), polyvinylidene fluoride (PVDF), polyurethane (PU) and a thermoplastic elastomer.

14. The method according to claim 1, characterized in that the polymer thread is made of a thermoplastic elastomer selected from the group of styrene block polymers styrene butadiene styrene (SBS), styrene ethylene/butylene styrene (SEBS), styrene ethylene/propylene styrene (SEPS), styrene ethylene/ethylene-propylene styrene, methacrylate butadiene styrene (MBS).

* * * * *